United States Patent

Bernitz et al.

[11] Patent Number: 4,698,193
[45] Date of Patent: Oct. 6, 1987

[54] METHOD AND APPARATUS FOR PRODUCING SEALING STRIPS AND SIMILAR PROFILED STRIPS OF RUBBER AND RUBBER-LIKE ELASTOMERS

[75] Inventors: Bernhard Bernitz; Richard Brodmann, both of Hanover; Dietmar Hermann, Garbsen, all of Fed. Rep. of Germany

[73] Assignee: Continental Gummi-Werke Aktiengesellschaft, Hanover, Fed. Rep. of Germany

[21] Appl. No.: 832,817

[22] Filed: Feb. 21, 1986

[30] Foreign Application Priority Data

Feb. 23, 1985 [DE] Fed. Rep. of Germany ....... 3506410

[51] Int. Cl.$^4$ .............. B29C 47/02; B29C 47/12
[52] U.S. Cl. ................ 264/171; 264/177.16; 264/177.19; 264/177.2; 264/229; 264/236; 264/257; 425/111; 425/112; 425/113; 425/131.1; 425/376 B; 425/461
[58] Field of Search ......... 264/236, 347, 177 R, 264/174, 171, 229, 257, 177.16–177.2; 425/113, 112, 131.1, 114, 376 B, 516, 461

[56] References Cited

U.S. PATENT DOCUMENTS

| | | | |
|---|---|---|---|
| 3,706,216 | 12/1972 | Weingarten | 264/174 |
| 3,776,670 | 12/1973 | Antioletti et al. | 425/114 |
| 3,813,199 | 5/1974 | Friesner | 264/174 |
| 3,843,760 | 10/1974 | Teed | 264/174 |
| 4,087,223 | 5/1978 | Angioletti et al. | 425/114 |
| 4,314,872 | 2/1982 | Schiesser | 425/114 |
| 4,511,526 | 4/1985 | Yamaguchi | 264/177 R |
| 4,563,141 | 1/1936 | Zoller | 264/177 R |

FOREIGN PATENT DOCUMENTS 2257129  5/1973  Fed. Rep. of Germany ...... 425/113

Primary Examiner—Jeffery Thurlow
Attorney, Agent, or Firm—Becker & Becker, Inc.

[57] ABSTRACT

Method and apparatus for producing sealing strips and similar profiled strips of rubber and rubber-like elastomers. Rubber-like profiled sealing strips for window or door openings are frequently provided with overlay strips to facilitate installation, to enhance the relative movements, or for aesthetic-visual reasons. The material of these overlay strips generally differs considerably from the material of the base main strip. The manufacture of such two-material profiles can be undertaken in a single extrusion step by joining and directly combining a prefabricated overlay strip with the main strip in the extrusion head of an extrusion press, where the shape is provided for the profiled strip. By stretching the overlay strip, the adhesion of the latter to the main strip is significantly improved.

9 Claims, 4 Drawing Figures ately after the strip has exited the extrusion orifice. However, it is also possible to first cool the inventively produced composite profiled strip, and to later vulcanize this strip.

METHOD AND APPARATUS FOR PRODUCING SEALING STRIPS AND SIMILAR PROFILED STRIPS OF RUBBER AND RUBBER-LIKE ELASTOMERS

BACKGROUND OF THE INVENTION

1. Field of the Invention

The present invention relates to a method of producing a sealing strip and similar profiled strips of rubber and rubber-like elastomers. An overlay strip of one material is disposed on and is bonded to, a portion of the outer, cross-sectional periphery of a main strip of a second, different material, with the overlay strip extending over the entire length of the main strip. The present invention also relates to a novel construction of the extrusion press that is suitable for carrying out such a method.

2. Description of the Prior Art

Various sealing strips are required for bordering doors or windows of motor vehicles or in buildings. On the one hand, due their elastic deformability, these strips provide good seals against the penetration of moisture and air. However, on the other hand, due to the rubber-like base material, these strips provide too much friction relative to the windowpanes or door surfaces that rest against or on the strips, and are movable relative thereto. It is known, for such applications, to provide portions of the sealing strips with a friction-reducing covering. The same conditions exist when differently colored or differently structured strips are to be applied to the profile, for example for aesthetic reasons.

In all cases, it is desired to cover the outer surface of the sealing strip with a relatively thin covering of a material other than rubber.

Up to now, such covers were generally applied to the finished base strip at a later time, and were frequently applied manually. This cover could be applied, for example, by electrostatic flocking, lacquering, or gluing.

In contrast, an object of the present invention is to continuously produce, in a ready-to-use state, profiled strands, especially those that are used as sealing strips, in a single operation while avoiding any manual operation, with said profiled strands thereby having an overlay strip that is satisfactorily bonded to the base main strip.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

Figure 1:
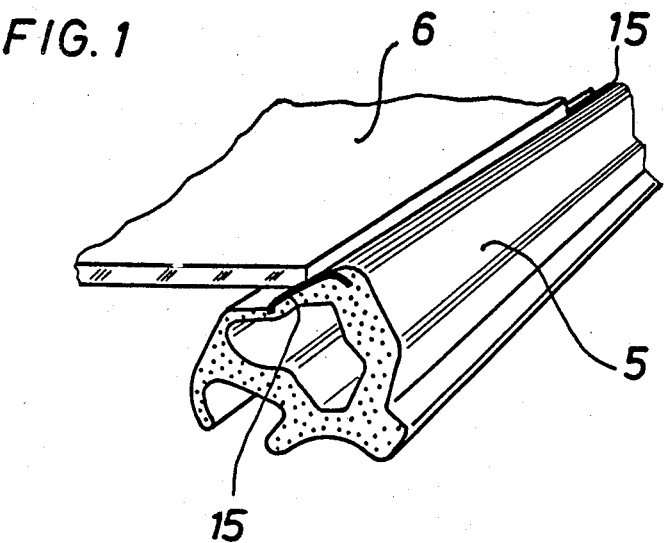
FIG. 1 is a cross-sectional perspective view of a portion of one inventive exemplary embodiment of a two-material profiled sealing strip on which a windowpane rests.

Pursuant to the inventive method, a prefabricated overlay strip is combined with the base main strip in the extrusion head of an extrusion press, and is extruded together with the main strip through the extrusion die or orifice. The thus formed composite profiled strip is subsequently vulcanized. The overlay strip can comprise homogeneous materials or layered materials of appropriate composition. Thus, for example, the overlay strip can comprise a thin sheet or foil of synthetic material, or can be built up of a material strip the outer surface of which is capable of sliding, and the inner surface of which, which faces the main strip, can be capable of adhering to the latter. In particular, this material strip can have on its inner surface a textile material that is prepared or coated with an adhesive.

To complete a profiled strip that has been provided with such an overlay strip, it is advantageous to utilize the "first heat" and to undertake vulcanization immediately after the strip has exited the extrusion orifice. However, it is also possible to first cool the inventively produced composite profiled strip, and to later vulcanize this strip.

Pursuant to a refinement of the present invention, a further improvement of the adhesion between the main strip and the overlay strip that is placed thereupon, especially in the case of sliding overlay strips, which can be comprised, for example, of polytetrafluoroethylene or similar synthetic materials that have a poor adhesive quality, can be achieved by placing the overlay strip on the main strip in a longitudinally stretched state of the overlay strip. In particular, one possibility is to apply the overlay strip directly to the main strip accompanied by the continuous application of a pulling force that brings about the stretched state. Another possiblity is to combine the overlay strip with the rubber-like base material of the main strip at a later point of time and in a prestretched condition, possibly after intermediate storage. The amount of stretch depends upon the material of the overlay strip, and can be between approximately 50% and a multiple of the original length of this strip.

The inventive stretching of the overlay strip results in a bond to the rubberlike base material of the main strip that is considerably more secure than is the case when the overlay strip is applied in a non-stretched state. This surprisingly favorable effect can even be achieved with overlay strips made of fluorocarbons, which, as known, have particularly poor adhesive properties. It should be noted that within the context of this application, "stretched state" refers always to a plastic, permanent elongation of the overlay strip in contrast to an elongation condition that exists only during the application of a pulling force.

In addition to the improved adhesive bond, further advantages of the inventive stretching include a greater resistance of the overlay strip to tearing, and an improved visual appearance of its surface. The reduction of the thickness of the strip that accompanies the stretching process shows up as a reduction in manufacturing costs due the material that is saved, and in addition reduces the otherwise unavoidable reinforcing effect on the finished profiled strip.

An extrusion press that is suitable for carrying out the inventive method is expediently provided with a guide means for introducing the overlay strip into the extrusion head, the discharge side of which is delimited by the extrusion orifice, and for combining the overlay strip with the main strip. Pursuant to further specific features of the present invention, the guide means can be a guideway that is connected to the extrusion head at an obtuse angle relative to the discharge direction of the profiled strip. Another alternative is to embody the guide means as a guideway that is connected to the outer wall of the extrusion die counter to the discharge direction of the profiled strip. In this latter case, the guideway, prior to the extrusion orifice and within the extrusion head, incorporates a change in direction that defines an angle of up to 180°.

Further advantageous features of the present invention will be described in detail subsequently.

DESCRIPTION OF PREFERRED EMBODIMENTS

Referring now to the drawing in detail, FIG. 1 shows a profiled main strip 5 that can be used, for example, as a sealing strip for the borders of windows in motor vehicles. This strip 5 predominantly comprises a weather-resistant rubber, and is provided only in that outer peripheral region that comes into sliding contact with the movable windowpane 6 with a sliding overlay strip 15 that is bonded to the main strip 5.

The overlay strip can be comprised of a particularly slidable synthetic material, such as polytetrafluoroethylene, a woven fabric, or a fabric that has been pretreated or coded to reduce friction. This overlay strip 15 forms on the main strip 5 a zone of increased ability to slide, where the windowpane 6 can easily slide.

As shown in the drawing, the overlay strip 15 is not placed upon the surface of the main strip 5 in such way as to increase the cross-sectional area thereof; rather, the edges of the overlay strip are embedded in the outer contour of the main strip 5 so that the overlay strip is integrated therein. This effects a mechanical anchoring over the overlay strip, thus additionally enhancing the self-substance adhesion of the overlay strip.

Figure 2:
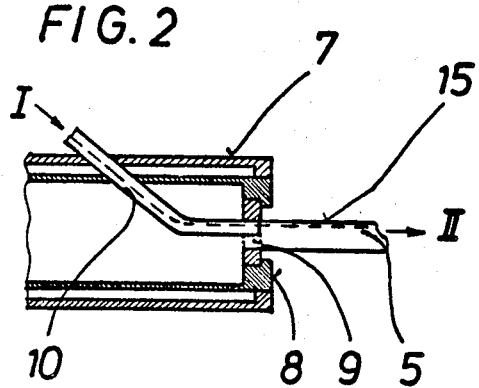
FIGS. 2 to 4 are longitudinally sectioned views of various inventive embodiments of a head, including the extrusion orifice, of an extrusion press that is suitable for producing the profiled strand of FIG. 1.
Figure 3:
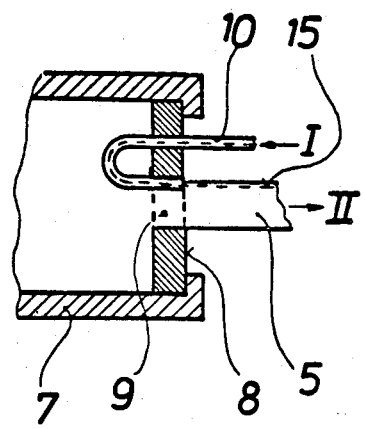
Figure 4:
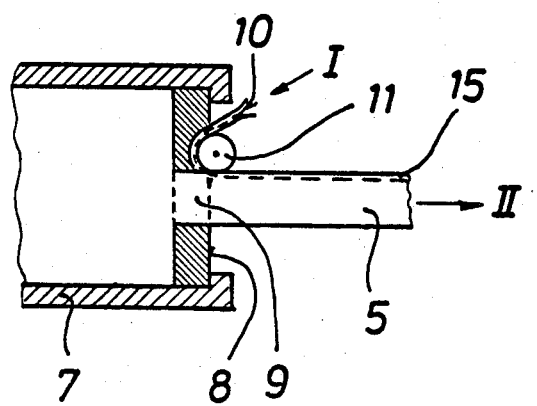

To manufacture such two-material profiled strips 5, 15, it is possible to use conventional extrusion presses that are provided with the additional devices illustrated in FIGS. 2, 3, and 4. To facilitate illustration, rather than showing a complete extrusion press, only those parts necessary for understanding the present invention are illustrated.

The extrusion head 7 illustrated in FIG. 2 forms the discharge portion of an extrusion press. The plasticized rubber mixture is fed into the extrusion head 7, from which, under the influence of the screw press, the rubber mixture is continuously extruded through the terminating mouthpiece 8 via the shape-giving extrusion die or orifice 9. A guideway 10, which is in the form of a conduit or a metal trough, is connected at an angle to the extrusion head 7 in such a way that this guideway permits the kink-free introduction of the overlay strip 15 from a non-illustrated feed drum, in the direction of the arrow I, into the interior of the extrusion head up to directly ahead of the extrusion orifice 9 for uniting the overlay strip with the plastic rubber material that enters the orifice. By forming the profile of the strip in the extruder, the two conponents of the strip are securely pressed together, and the finished-shaped two-material strip 5, 15 leaves the extrusion orifice 9 in the direction of the arrow II as a uniform article. Depending upon existing circumstances, this finished article can be subjected to vulcanization either immediately, without first being cooled off, or later after again being heated up.

In the extrusion head 7 illustrated in FIG. 3, the guideway 10 is connected directly to the front of the mouthpiece 8 that contains the extrusion orifice 9 counter to the direction of extrusion; this entails changing the feed direction (arrow I) for the overlay strip within the extrusion head by an angle of approximately 180°. In contrast to the embodiment of FIG. 2, this construction has the advantage that the housing of the extrusion head itself is not structurally affected, and operational modifications are possible by simply exchanging the mouthpiece 8. The same is essentially true for the embodiment illustrated in FIG. 4. In this case, the guideway 10 is again connected to the front of the mouthpiece 8, with a rotatably mounted guide roller 11 being provided in the region where the direction of the guideway changes. It is to be understood that in place of the guide roller 10, it would also be possible to use a rigid sliding piece or some other rigidly mounted guide element.

The present invention is, of course, in no way restricted to the specific disclosure of the specification and drawing, but also encompasses any modifications within the scope of the appended claims.

What we claim is:

1. A method of producing a profiled strip of rubber or rubber-like elastomer, with an overlay strip of one material being disposed on, and bonded to a portion of the outer, cross-sectional periphery of a base main strip of a second, different material, said overlay strip extending over the entire length of said main strip; said method comprising the steps of:

providing a prefabricated overlay strip made of plastic having on that surface facing away from said main strip a friction-reducing synthetic material that is capable of sliding, and having on that surface that faces said main strip an adhesive material that is capable of adhering to said main strip;

stretching said overlay strip in the longitudinal direction thereof, and placing said overlay strip in such a stretched state, on said main strip;

combining the prefabricated overlay strip with said main strip in the extrusion head of an extrusion press;

extruding said overlay strip and said main strip together through extrusion orifice means of said extrusion head to form a profiled strip; and finally vulcanizing said thus-formed profiled strip.

2. A method according to claim 1 in which said stretching step includes permanently stretching said overlay strip; and which further includes the step of temporarily storing said stretched overlay strip prior to said step of placing said overlay strip on said main strip.

3. A method according to claim 1 which includes the step of placing said overlay strip on said main strip while applying to the former a pulling force that brings about stretching of said overlay strip.

4. A method according to claim 1 which includes stretching said overlay strip to a length that is from 50% to several times the original, unstretched length of said overlay strip.

5. An extrusion press for producing a profiled strip of rubber or rubber-like elastomer, with a prefabricated overlay strip of friction-reducing synthetic material being disposed on, and bonded adhesively to a portion of the outer, cross-sectional periphery of a base main strip of a second, different material, said overlay strip extending over the entire length of said main strip; said press comprising:

an extrusion head including a terminating mouthpiece and means forming an extrusion die orifice at a discharge end thereof;

a guide means connected to said means forming said extrusion die orifice for combining a prefabricated overlay strip with said main strip in the extrusion head of the extrusion press when passing said overlay strip and said main strip together through extrusion die orifice of said extrusion head to form a profiled strip; said guide means including a bent guideway for introducing said overlay strip into said extrusion head, the discharge end of which is delimited by said extrusion die orifice, and for effecting stretched combining of said overlay strip with said main strip; said guide means being in the form of said bent guideway that is connected at an angle to said extrusion head in such a way that it extends at an obtuse angle to the direction in which said main strip is discharged from said extrusion head for final vulcanizing of said thus-formed profiled strip.

6. An extrusion press for producing a profile strip of rubber or rubber-like elastomer, with a prefabricated overlay strip of friction-reducing synthetic material being disposed on, and bonded adhesively to a portion of the outer, cross-sectional periphery of a base main strip of a second, different material, said overlay strip extending over the entire length of said main strip, said press comprising:

an extrusion head including a terminating mouthpiece that defines an extrusion die orifice at a discharge end thereof;

a guide means connected to said terminating mouthpiece for combining a prefabricated overlay strip with said main strip in the extrusion head of the extrusion press when passing said overlay strip and said main strip together through extrusion die orifice of said extrusion head to form a profiled strip; said guide means for introducing said overlay strip into said extrusion head having a discharge side thereof delimited by said extrusion die orifice and arranged for effecting stretched combining of said overlay strip with said main strip; said guide means being in the form of a guideway that is connected to an outer wall of said extrusion die orifice in such a way that it extends counter to the direction in which said main strip is discharged from said extrusion head for final vulcanizing of said thus formed profiled strip.

7. An extrusion press according to claim 6, in which said guideway, within said extrusion head, and prior to said extrusion orifice means when viewed in said discharge direction of said main strip, incorporates a change in direction that defines an angle of up to 180°.

8. An extrusion press according to claim 7, in which said guideway is provided with a guide element that is securely mounted on said extrusion head.

9. An extrusion press according to claim 8, in which said guide element is a rotatably mounted guide roller about which said overlay strip, via said guideway, is partially looped.

* * * * *